United States Patent [19]

Nagai et al.

[11] Patent Number: 5,192,070
[45] Date of Patent: Mar. 9, 1993

[54] SUCTION PAD

[75] Inventors: Shigekazu Nagai; Shuuzou Sakurai; Tadasu Kawamoto, all of Ibaraki, Japan

[73] Assignee: SMC Kabushiki Kaisha, Tokyo, Japan

[21] Appl. No.: 755,745

[22] Filed: Sep. 6, 1991

[30] Foreign Application Priority Data

Sep. 6, 1990 [JP] Japan .................. 2-093900[U]

[51] Int. Cl.$^5$ ............................. B65H 3/08
[52] U.S. Cl. ......................... 271/90; 294/64.1
[58] Field of Search .................... 271/90; 294/64.1

[56] References Cited

U.S. PATENT DOCUMENTS

| 715,905 | 12/1902 | Tuck et al. | 294/64.1 |
|---|---|---|---|
| 1,842,383 | 1/1932 | Bell | 294/64.1 |
| 2,194,989 | 3/1940 | Torpin | 294/64.1 |
| 2,815,919 | 12/1957 | Pribil | 248/363 |
| 2,916,059 | 12/1959 | Wong | 294/64.1 |
| 3,152,828 | 10/1964 | Lytle | 294/64.1 |
| 3,165,899 | 1/1965 | Shatto, Jr. | 294/64.1 |
| 3,261,388 | 7/1966 | Kovac et al. | 116/208 X |
| 3,743,340 | 7/1973 | Williamann . | |
| 3,910,620 | 10/1975 | Sperry | 294/64.1 |
| 4,049,484 | 9/1977 | Priest | 271/90 |
| 4,327,906 | 5/1982 | Fröhlich et al. | 271/90 |
| 4,600,229 | 7/1986 | Oten | 294/64.1 |
| 4,702,508 | 10/1987 | Weiner et al. | 116/208 X |

FOREIGN PATENT DOCUMENTS

| 0269566 | 6/1988 | European Pat. Off. . | |
|---|---|---|---|
| 325280 | 7/1989 | European Pat. Off. | 294/64.1 |
| 1956614 | 6/1970 | Fed. Rep. of Germany . | |
| 1928727 | 1/1971 | Fed. Rep. of Germany . | |
| 2330204 | 1/1975 | Fed. Rep. of Germany | 294/64.1 |
| 2440691 | 3/1976 | Fed. Rep. of Germany | 294/64.1 |
| 1142409 | 2/1985 | U.S.S.R. | 294/64.1 |
| 1509319 | 9/1989 | U.S.S.R. | 294/64.1 |
| 327619 | 4/1930 | United Kingdom | 271/90 |
| 1180510 | 2/1970 | United Kingdom | 294/64.1 |
| 1216630 | 12/1970 | United Kingdom . | |
| 1301637 | 1/1973 | United Kingdom . | |
| 1308796 | 3/1973 | United Kingdom . | |
| 1325119 | 8/1973 | United Kingdom . | |

Primary Examiner—Robert P. Olszewski
Assistant Examiner—Steven M. Reiss
Attorney, Agent, or Firm—Oblon, Spivak, McClelland, Maier & Neustadt

[57] ABSTRACT

Disclosed herein is a suction pad for attracting and holding a work, which comprises a suction base coupled via a connector to a vacuum suction source, a suction skirt integrally provided in continuation with the base, and a vacuum chamber which is defined inside the suction pad and communicates with the inside of the skirt. In addition, the suction pad includes a plurality of smaller-diameter through holes which cause the vacuum chamber to communicate with a suction surface of the skirt, and partition walls for surrounding the through holes. The partition walls define a number of small vacuum chambers.

2 Claims, 3 Drawing Sheets 5,192,070

SUCTION PAD

BACKGROUND OF THE INVENTION

1. Field of the Invention

The present invention relates to a suction pad for attracting a work so as to enable the work to be fed to a desired position.

2. Description of the Related Art

There has heretofore been used a suction cup or pad which communicates with a vacuum suction source in order to feed, for example, a thin plate-shaped work to a predetermined position. This type of suction pad normally has a suction base and a suction skirt integrally provided in continuation with the base. In addition, the suction pad is mounted on an arm of a robot through a connector and used to feed a work, for example. At this time, when a tube extending from the vacuum suction source is connected to the base of the suction pad in such a way as to enable the vacuum suction source to suck or draw air inside the skirt, the work is attracted and held by the suction pad under reduced pressure of the skirt so as to be fed to a desired position.

The suction pad employed in the prior art will now be described with reference to FIGS. 1 and 2.

In order to feed a work W attracted and held by a suction pad 2, the distal end of a thin and flexible suction skirt 4 of the suction pad 2 is brought into contact with the work W. Then, the vacuum suction source is energized to suck or draw air inside the skirt 4 through a through hole 7 defined in a suction base 6 and an adapter 8 mounted on the base 6. As a consequence, the skirt 4 serves to attract and hold the work W from the distal end thereof under the reduced pressure of the skirt 4, thereby feeding the same to a desired position.

In this case, as the sectional form of the skirt is properly used either a circle or an ellipse according to the shape, weight, etc. of a work to be fed.

However, in the above prior art, when the suction pad 2 attracts and holds the work W, the end of the skirt 4 is brought into abutment against the work W. However, a contact area of the suction pad 2 with respect to the work W is increased or decreased according to the pressure, i.e., vacuum for sucking or drawing the air inside the skirt 4. When a vacuum, i.e., negative pressure inside the skirt 4 is increased in a state in which the suction pad 2 attracts and holds the work W as shown in FIG. 1 by way of example, the area of a contact surface 9 of the skirt 4 with respect to the work W is increased as shown in FIG. 2. Specifically, when the pressure for sucking or drawing the air inside the skirt 4 is increased or decreased at the time the suction pad 2 attracts the work W, the area of the contact surface 9 of the suction skirt 4 with respect to the work W changes. This shows that the attraction or suction force of the skirt with respect to the work is changed according to the change in the contact area.

Thus, when the vacuum for sucking the air inside the skirt is established to an initial condition, the theoretical value of the attraction or suction force is subjected to a complex calculation, and hence the accuracy of its calculation is low.

In the above-described suction pad, the position where the suction pad attracts and holds the work is displaced so as to move a part of the skirt away from the work. When the inside of the suction pad reaches the atmospheric pressure, the work is released from the skirt and therefore drops away from it.

When it is desired to feed a work having low rigidity, the work tends to drop. Consequently, space occurs between the work and the suction surface of the suction pad to produce a vacuum break, thereby releasing the work from the skirt while the work is being fed.

SUMMARY OF THE INVENTION

It is a general object of the present invention to provide a suction pad of a type wherein the theoretical value of the attraction force can simply and more accurately be calculated and an appropriate vacuum for sucking air can be easily initiated.

It is a principal object of the present invention to provide a suction pad of a type wherein a vacuum chamber is defined inside the suction pad, and a plurality of smaller-diameter through holes which communicate between the vacuum chamber and a suction surface of the suction pad are defined to be surrounded with partition walls formed therearound in such a way as to define a number of small vacuum chambers, thereby making it possible to feed a work without the work separating from the suction pad even when some space occurs between the work and the suction surface while the work is being fed.

It is another object of the present invention to provide a suction pad for attracting and holding a work, comprising a suction base coupled via a connector to a vacuum suction source, a suction skirt integrally provided in continuation with the base, and a vacuum chamber defined inside the suction pad, the vacuum chamber communicating with the inside of the skirt.

It is a further object of the present invention to provide the suction pad further including a plurality of smaller-diameter though holes which enable the vacuum chamber to communicate with a suction surface of the skirt, and partition walls for surrounding the through holes, the partition walls defining a number of small vacuum chambers.

It is a still further object of the present invention to provide the suction pad wherein the partition walls formed around the through holes are substantially of a plurality of ribs, and a contact area of the skirt with respect to the work is increased by the ribs.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS

Figure 1:
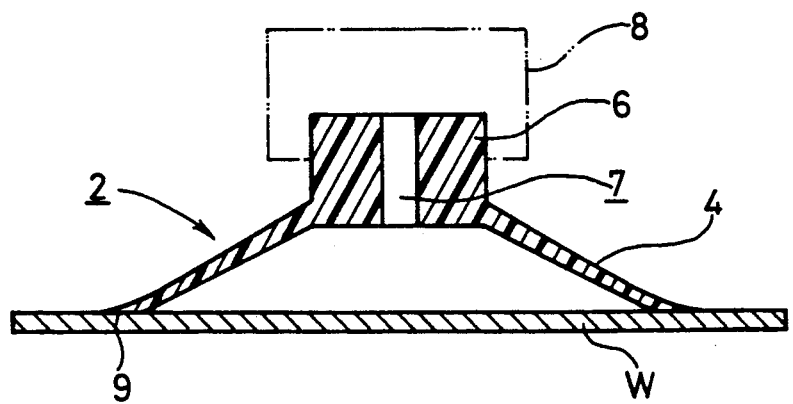
FIGS. 1 and 2 are cross-sectional views of a conventional suction pad.
Figure 2:
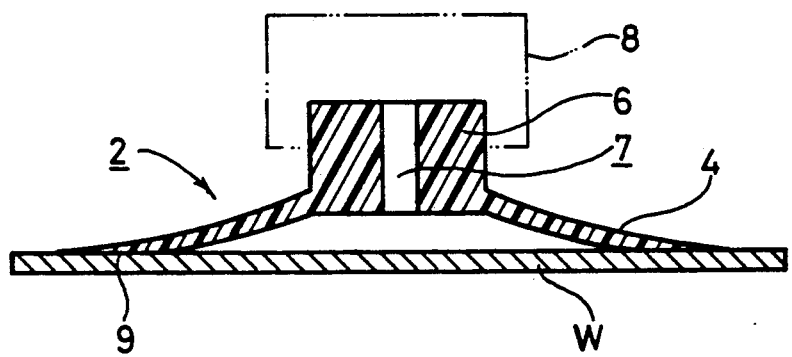
Figure 3:
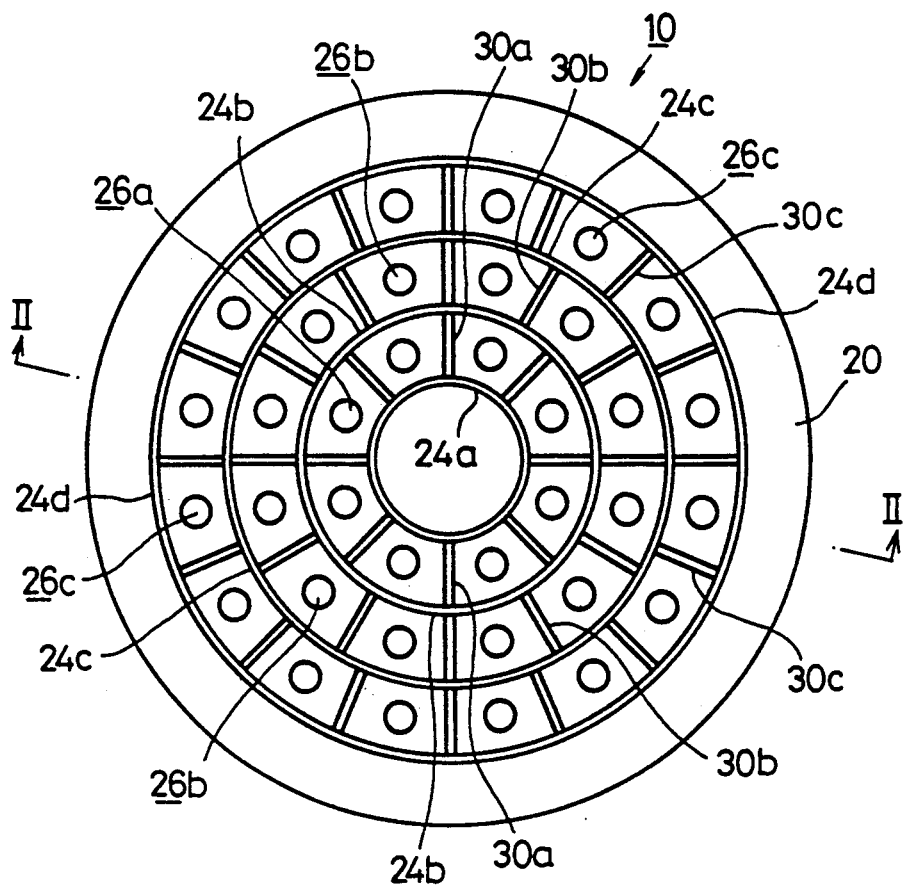
FIG. 3 is a bottom plan view of a suction pad according to a first embodiment of the present invention.
Figure 4:
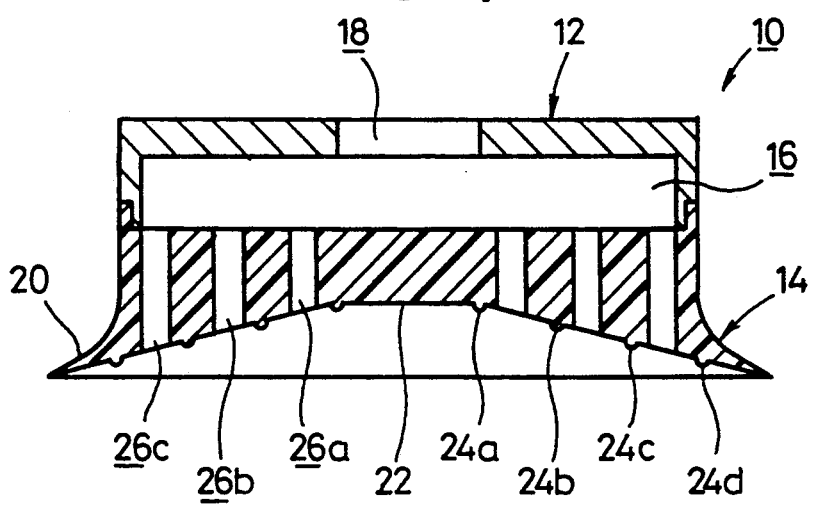
FIG. 4 is a longitudinal cross-sectional view taken along line II—II of FIG. 3.

Referring to FIGS. 3 and 4, designated at numeral 10 is a suction pad according to a first embodiment of the present invention. The suction pad 10 basically comprises a base 12 which communicates with an unillustrated vacuum suction source, and a suction skirt 14 integrally provided in continuation with the base 12.

The base 12 is shaped substantially in the form of a cylinder and mounted on the distal end of an arm of a robot through an unillustrated connector. The base 12 has a first vacuum chamber 16 defined therein, whose capacity or volume is large so as to keep the first vacuum chamber 16 under vacuum. In addition, the base 12 has a through hole 18 defined in an upper wall thereof, which causes the unillustrated vacuum suction source to communicate with the first vacuum chamber 16.

The skirt 14 is formed of a flexible material, and has a thin-walled flange 20 formed at the entire peripheral edge thereof and an attraction or suction surface 22 formed on the bottom side thereof. There are also concentrically formed a plurality of protrusions 24a through 24d each of which extends in the circumferential direction of the suction surface 22 and forms a part of a partition wall. In addition, a number of through holes 26a through 26c are concentrically defined among these protrusions 24a through 24d. Each of the through holes 26a through 26c is of a smaller-diameter, and has a diameter between 0.5 mm and 1 mm, for example. Each of the through holes 26a through 26c also communicates with the first vacuum chamber 16 defined in the base 12. There are formed among the respective through holes 26a through 26c a plurality of projections 30a through 30c each of which extends in the radial direction of the suction pad 10 and constitutes a part of a partition wall. Thus, the periphery of each of the through holes 26a through 26c is surrounded by the protrusions 24a through 24d and the projections 30a through 30c so as to define a number of second small vacuum chambers.

A description will now be made of operation of the suction pad 10 constructed as described above.

The suction pad 10 is mounted on the distal end of the arm of the robot. In addition, the suction pad 10 is connected to a tube or the like extending from the unillustrated vacuum suction source so as to enable the vacuum suction source to suck or draw air inside the skirt 14 via the first vacuum chamber 16 and the through holes 26a through 26c.

As a result, a work is attracted and held by the suction pad 10 while the skirt 14 is being subjected to the vacuum, i.e., reduced pressure, and then fed to a desired position. In this case, the above-described second vacuum chambers defined in the suction surface 22 of the skirt 14 formed of the flexible material respectively independently perform attracting operations, and serve to prevent the flange 20 from adhering closely to the work and to prevent air from entering from between the work and the skirt 14.

Let's now assume that when a certain force is applied to the work while being fed, the suction pad 10 is swung in the front-to-rear direction or from side to side so that a part of the suction pad 10 is moved away from the work, thereby causing parts of the second vacuum chambers defined in the bottom 22 of the skirt 14 to communicate with air. In this case, only the parts of the second vacuum chambers, which communicate with the air, are subjected to a vacuum break. However, this does not exert an influence on the remaining second vacuum chambers. Specifically, such remaining second vacuum chambers respectively independently carry out the attracting operations, thereby enabling the work to be fed to a desired position while it is being attracted and held by the suction pad 10 without separating the work from the suction pad 10. Since the diameter of each of the through holes 26a through 26c defining the second vacuum chambers is much smaller than that of the first vacuum chamber 16, the attracting operations of the remaining second vacuum chambers can continuously be performed without a failure in the suction operation of the first vacuum chamber 16 by the vacuum break, so that the work can be fed without being released from the suction pad 10.

In the present embodiment, as described above, there are defined in the suction pad 10, the first vacuum chamber 16 having the large volume and the second small vacuum chambers. Thus, the respective second vacuum chambers thus defined therein serve to attract the work, thereby enabling the work to be fed to a desired position without separating the so-attracted work therefrom while the work is being fed.

Figure 5:
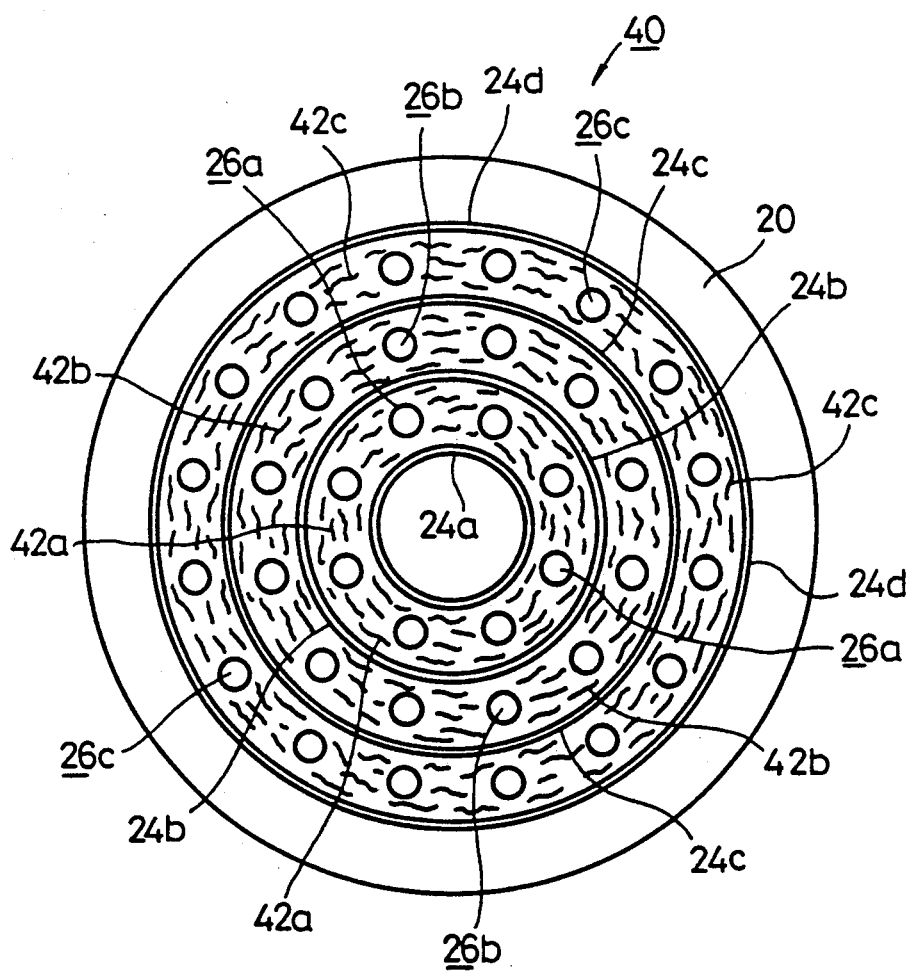
FIG. 5 is a bottom plan view of a suction pad according to a second embodiment of the present invention.

FIG. 5 shows a suction pad 40 according to a second embodiment. The same elements of structure as those employed in the first embodiment are identified by like reference numerals and their detailed description will therefore be omitted.

The present embodiment differs from the first embodiment in that the suction pad 40 employed in the present embodiment has a number of ribs 42a through 42c respectively formed around a number of through holes 26a through 26c defined in an attraction or suction surface 22 of a skirt 14.

The skirt 14 is formed of a flexible material, and has a thin-walled flange 20 formed at the full peripheral edge thereof and the attraction surface 22 formed at the bottom of the skirt 14. There are concentrically formed a plurality of protrusions 24a through 24d each of which extends in the circumferential direction of the attraction surface 22. In addition, a number of through holes 26a through 26c are concentrically defined among these respective protrusions 24a through 24d. Each of the through holes 26a through 26c communicates with a first vacuum chamber 16 defined in the base 12. There are also formed an infinite number of ribs 42a through 42c referred to above each of which is formed around each of the through holes 26a through 26c and extends in the circumferential direction.

A description will now be made of operation of the present embodiment. A work is attracted and held by the suction pad 40 while the skirt 14 is being under the reduced pressure and then fed to a desired position. When the suction pad 40 abuts against the work, the ribs 42a through 42c which are respectively formed on the peripheries of the through holes 26a through 26c defined in the bottom 22 of the skirt 14, are squeezed so that a contact area of the skirt 14 with respect to the work is increased. Thus, the degree of vacuum at the through holes 26a through 26c partitioned, i.e., sectioned by the ribs 42a through 42c respectively is increased, thereby making it possible to reliably attract and hold the work by the suction pad 40. Accordingly, even when a part of the skirt 14 is released from the work, air is not introduced into the through holes 26a through 26c other than those corresponding to the part of the skirt 14 owing to the provision of a number of ribs 42a through 42c, thereby causing no failure to attract and hold the work by the suction pad 40.

In the present embodiment, as described above, the ribs 42a through 42c are formed around the through holes 26a through 26c respectively and brought into contact with the work. Thus, the contact area of the skirt with respect to the work can be increased and the vacuum chambers can be prevented from being subjected to the vacuum break.

Incidentally, it is needless to say that the suction pad is not necessarily limited to the shape of a circle employed in the illustrated embodiments and may be shaped in the form of an ellipse.

The suction pad according to the present invention has the following advantages.

Since the first vacuum chamber which communicates with the inside of the skirt is defined in the suction pad, the contact area of the skirt with respect to the work is rendered constant when the pressure for sucking or drawing air is applied, thereby making it possible to accurately calculate the theoretical value of the attraction force proportional only to the vacuum. Thus, the control of the vacuum generation source with respect to the suction force of the suction pad can be simplified at one time.

In addition, the suction pad according to the present invention has a plurality of smaller-diameter through holes defined therein, which enable the vacuum chamber defined inside the suction pad to communicate with the attraction surface. In this way, the diameter of each of the through holes is rendered small so as to reduce an effective sectional area, thereby preventing air from flowing into the first vacuum chamber in large quantities. Thus, even when a part of the work is released from the suction pad, a reduction in the attraction force can be minimized. In addition, since a number of second small vacuum chambers are defined by partition walls surrounding the holes, the vacuum break does not exert an influence on adjacent second vacuum chambers, and the respective second vacuum chambers independently attract and hold the work. Thus, even if the part of the work is released from the attraction surface of the suction pad, a number of second vacuum chambers other than the second vacuum chambers associated with the part of such a work serve to attract and hold the work, thereby making it possible to attract and feed the work without releasing the work from the attraction surface of the suction pad. Even when a work such as a substrate, having holes whose positions are not clearly defined, is fed, it is unnecessary to change the shape of the suction pad because the holes defined in the attraction surface are independently defined.

By bringing each of the ribs formed around the holes into contact with the work, the contact area of the skirt with respect to the work can be increased, and hence the degree of the vacuum of the respective through holes can be rendered high.

Although certain preferred embodiments have been shown and described, the present invention is not necessarily limited to the present embodiments. It should be understood that many changes and modifications may be made without departing from the spirit or scope of the invention as set forth herein.

What is claimed is:

1. A suction pad for attracting and holding a workpiece, comprising:

a suction base coupled via a connector to a vacuum suction source;

a suction skirt connected with said suction base, said suction skirt including a separating wall disposed between said suction base and an inside of said suction skirt;

a first vacuum chamber defined inside said suction base above said separating wall, said separating wall separating said first vacuum chamber and the inside of said suction skirt;

a plurality of small diameter through holes defined in said separating wall for allowing said first vacuum chamber to communicate with the inside of said suction skirt;

a plurality of circular partition walls concentrically disposed on said separating wall facing the inside of said suction skirt and adjacent said through holes; and a plurality of radial projections radially disposed on said separating wall, said projections being disposed between respective concentrically disposed partition walls and adjacent said through holes, wherein said partition walls and said projections jointly define a plurality of second vacuum chambers surrounding each of said through holes, and wherein when said suction pad is holding a workpiece said second vacuum chambers are defined between said separating wall and the workpiece held by said suction pad.

2. A suction pad for attracting and holding a workpiece, comprising:

a suction base coupled via a connector to a vacuum suction source;

a suction skirt connected with said suction base, said suction skirt including a separating wall disposed between said suction base and an inside of said suction skirt;

a firs vacuum chamber defined inside said suction base above said separating wall, said separating wall separating said first vacuum chamber and the inside of said suction skirt;

a plurality of small diameter through holes defined in said separating wall for allowing said first vacuum chamber to communicate with the inside of said suction skirt;

a plurality of circular partition walls concentrically disposed on said separating wall facing the inside of said suction skirt and adjacent said through holes, wherein when said suction pad is holding a workpiece said partition walls jointly define a plurality of second vacuum chambers defined between said separating wall ad the workpiece held by said suction pad; and a plurality of ribs disposed between respective concentrically disposed partition walls and adjacent said through holes for increasing a contact area between said skirt and the workpiece held by said suction pad.

* * * * *